Feb. 24, 1959 W. FREDERICKS 2,875,266

TERMINAL PROTECTIVE DEVICE

Filed Sept. 30, 1955

*INVENTOR.*
WILLIAM FREDERICKS

*BY* William R. Lane

ATTORNEY

United States Patent Office 2,875,266

Patented Feb. 24, 1959

2,875,266

TERMINAL PROTECTIVE DEVICE

William Fredericks, Torrance, Calif., assignor to North American Aviation, Inc.

Application September 30, 1955, Serial No. 537,802

4 Claims. (Cl. 174—138)

This invention relates generally to insulators and more particularly relates to a mechanical insulating device for the protection of the terminal stud of a thermocouple against harmful mechanical and electrical shock.

Thermocouple elements which constitute the sensing units in aircraft fire detection systems are extremely susceptible to damage from a number of sources. Being located at carefully selected locations throughout the aircraft, many of the thermocouple sensing units are subjected to extreme vibration, others must withstand high localized temperatures, while all of the units are subjected to varying degrees of mechanical abuse.

Thermocouple art has progressed to its present advanced state of development wherein adequate protection is provided, by various means, for the thermocouple conductors and the thermocouple junction itself. However, the present state of the art shows that no adequate or effective means had been devised to protect the output terminal or terminals of such a thermocouple, against the conditions described above, until the present invention.

Prior to the protective device of the present invention, failures of the aircraft fire detection system and false warnings due to such failures were common due to mechanical defects caused by damage occurring during ground maintenance work. Since the terminal ends of the thermocouple sensing units are often mounted in exposed locations within the aircraft, it has been found that mechanical injury frequently occurs to the terminals and the conductors connected thereto through carelessness of the ground maintenance crews, such as by stepping on the connection, accidentally hitting the connection with tools, etc. Additionally, the protective device is designed to provide adequate electrical insulation for the sensing unit terminals against accidental contact with grounded objects and consequent short-circuiting.

It is therefore an object of this invention to provide a fire detector thermocouple terminal insulating cap to reduce the incidence of false warnings caused by defects in the fire warning system.

It is also an object of this invention to provide a thermocouple terminal insulating cap that will withstand elevated temperatures, vibration and electrical short-circuiting.

It is a further object to provide a terminal insulating cap for a fire sensing thermocouple unit that will reduce the maintenance required for such a fire detection system.

It is a still further object to provide a thermocouple terminal insulating cap that will prolong the useful life of a fire sensing thermocouple unit and will provide a dependable fire detection system.

These and other objects and advantages of the present invention will become apparent to those skilled in the art after reading the present specification and the accompanying drawings forming a part hereof, in which.

Figures 1, 2, 3:
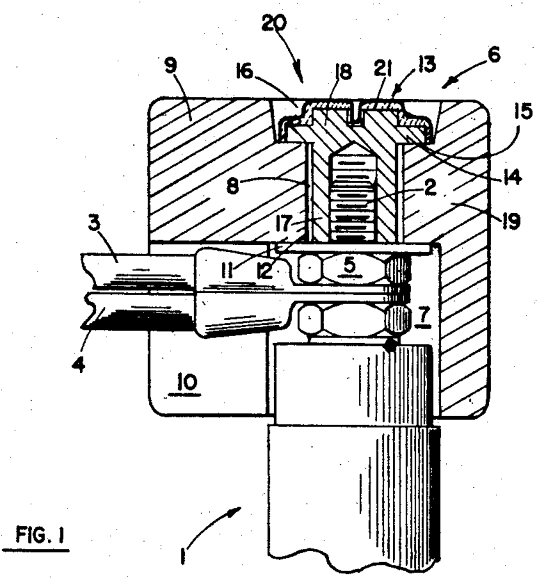
Fig. 1 is a view showing the terminal cap and fire detector thermocouple assembly with the terminal cap in cross section and the thermocouple in elevation.
Fig. 2 is a plan view of the terminal cap and thermocouple assembly.
Fig. 3 is a left-hand elevational view of the terminal cap and thermocouple assembly.

Referring specifically to the drawings, wherein like reference characters have been used throughout the several views to designate like parts, and referring at first to Fig. 1 reference numeral 1 designates a fire detector unit comprising a thermocouple and terminating in a threaded stud portion 2 to which electrical conductors 3—4 are secured by check nut 5.

Surrounding terminal stud 2 and covering the terminal attaching ends of conductors 3—4 is insulating terminal shield or cap assembly 20 comprising terminal cap or block 6 and flanged cap nut 13 detachably securing terminal cap 6 to the terminal stud 2 of thermocouple unit 1.

Terminal cap 6 has a substantially cylindrical body portion 19 having an axial bore 8 extending therethrough with counterbores forming recess 16, 7 around said bore, at the top and bottom thereof, respectively. Cap 6 also includes an integral side boss 9, slotted at 10 so as to form an inverted U-shaped shield for the terminal attaching ends of conductors 3—4. Cap 6 may be formed from any number of suitable insulating materials including thermosetting plastics, fiber-glass, ceramics and the like and may be made by any suitable process. However, in the preferred embodiment of this invention cap 6 may best be made by being molded from a ceramic material such as steatite.

Cap nut 13 has a body portion 17, head portion 18, and flange 14 extending laterally from the cap nut, intermediate the body and head portions. The lower end of nut 13 has a threaded axial bore therein to form a mating female member to the male terminal stud 2. Body portion 17 of cap nut 13 fits loosely into bore 8 of terminal cap 6, and the undersurface of flange 14 bears on the shoulder 15 formed by the bottom of recess 16, with head portion 18 being wholly within recess 16. Head portion 18 and flange 14 of cap nut 13 are coated with a suitable electrical insulation material 21, such as Solaramic, a commercially obtainable insulation coating manufactured by the Solar Aircraft Company. Nut 13 includes self-locking features, which form no part of this invention, and the head may be slotted for a screw driver or have a socket for an Allen wrench.

In assembling the terminal cap 6 and cap nut 13 on detector unit 1, a corrosion resistant steel washer 11 is placed on the upper surface of lock nut 5 and cap 6 is positioned thereon with shoulder 12, formed by the upper surface of recess 7, bearing on washer 11. Cap nut 13 is then inserted into bore 8 and rotated to firm threaded engagement with stud 2. Flange 14, bearing on shoulder 15, draws terminal cap 6 down tightly against washer 11 and locks the terminal cap firmly in position surrounding the terminal stud 2.

From the above description it will be seen that the present invention embodies a device whereby the terminal connections of a fragile, sensitive device, such as a thermocouple or any other exposed or shock sensitive electrical device, may be protected. Since the terminal cap 6 is formed of an insulating material and the flange 14 and head portion 18 of cap nut 13 are covered with a protective insulating coating, the terminal stud 2 is substantially completely surrounded and protected against accidental contact of the terminal stud with an outside object and possible consequent short-circuiting thereof. Boss 9 provides a similar protective housing for the end portions of attaching conductors 3 and 4 adjacent their attaching ends on terminal stud 2.

Terminal cap 6, being of an insulating material, preferably a ceramic material, has a high coefficient of thermal resistivity. Similarly, the insulating coating on the exposed exterior surfaces of steel cap nut 13 increases the thermal resistance of the nut. Consequently, the terminal cap assembly is able to withstand high temperature and may be located in regions of high operating temperatures, such as engine compartments where temperatures of 1200°–1500° Fahrenheit may be encountered.

In addition, cap 6 shields the terminals against physical damage caused by careless maintenance workers such as the accidental tearing loose of the conductors from the terminal, breaking of the conductors, or the bending or breaking of the terminal stud.

Thus, the disclosed embodiment of this invention provides a relatively simple but unique terminal protective device having great utility. By attaching the insulating cap to the terminal stud itself no additional independent fastening devices or methods of fastening the cap to the detector unit are required. The protective cap, being attached to the terminal stud of the thermocouple unit and occupying a relatively small volume, does not hamper the installation of the thermocouple detector units nor interfere with their ease or flexibility of operation in any manner.

While a particular embodiment of this invention has been illustrated and described herein, it will be apparent that various changes and modifications may be made in the construction and the arrangement of the various parts without departing from the spirit and scope of this invention in its broader aspects or as defined in the following claims.

I claim:

1. A protective insulating cap assembly for a member having a threaded electrical terminal stud and the ends of the conductors attached thereto comprising an insulating member adapted to be attached to said terminal stud, said member having a substantially cylindrical portion with an axial bore therethrough and counterbores at each end of the cylindrical portion, said member further including an integral radially extending inverted U-shaped portion adapted to be placed over the conductor ends and surround them on three sides, and a one-piece cap nut adapted for threaded engagement with said terminal stud, said nut having a body portion adapted to fit within said bore and a radially extending annular flange adapted to seat on the bottom of the upper counterbore whereby the insulated member is pressed downwardly onto the conductor end attaching means and rigidly positioned on the stud without contacting said conductors and said member, said nut having an insulating coating on its exposed upper surfaces whereby the terminal stud and attached conductor ends are substantially completely surrounded by insulating shield.

2. A protective insulating cap assembly for a member having a threaded electrical terminal stud and the ends of conductors attached thereto comprising an insulating elbow adapted to be attached to and to cover said terminal stud, said elbow having a hollow cylindrical portion extending concentrically about said terminal and an integral hollow portion open at the bottom extending radially outwardly from said concentric portion and adapted to fit loosely and removably over the attaching ends of the conductors, said cylindrical portion having axial counterbores forming a recess at each end thereof, a washer positioned on said stud to provide a seating surface for said cylindrical portion, and a one-piece metallic cap nut adapted for threaded engagement with said terminal stud, said nut having a body portion adapted to fit within said hollow cylindrical portion and a radially extending annular flange adapted to bear on the bottom of the upper counterbored recess whereby the cylindrical portion is rigidly positioned on the stud by being pressed downwardly into seating engagement with said washer without contacting said conductors and said member, said nut having a slot therein and also having an insulating coating on its exposed exterior surfaces whereby a continuous uninterrupted insulating surface is formed on the exterior of said cap assembly and the terminal stud and attached conductor ends are substantially completely surrounded by said insulating cap assembly.

3. A protective insulating cap assembly for a member having a threaded electrical terminal stud with the ends of a conductor attached thereto by at least one nut threaded on said stud comprising an insulated block adapted to be attached to said terminal stud after the conductor ends have been attached thereto, said block having a substantially cylindrical body portion having an axial bore therethrough with counterbores forming a recess around said bore at the upper and lower ends thereof, said lower recess being adapted to substantially enclose the lower portion of said terminal stud and the conductor attaching nut, said axial bore being adapted to substantially surround the upper portion of said stud, said block having an integral radially extending portion with a U-shaped cross section having the open side thereof facing downwardly and adapted for shielding the ends of the attached conductors on three sides, said insulating cap assembly being removable from and replaceable on said terminal stud without interfering with or contacting such conductors and without requiring removal of said attached conductor ends from said terminal stud, a flat surfaced washer positioned on said stud and seated on said conductor end attaching nut to provide a seating surface for said cylindrical portion, and a one-piece metallic cap nut having a slotted head portion adapted for threaded engagement with said terminal stud, said cap nut having a cylindrical internally threaded body portion adapted to fit within said bore and engage the stud upper portion, said cap nut also having a radially extending annular flange adapted to bear on the bottom of the upper recess whereby the cylindrical body portion is rigidly positioned on the stud by being pressed into seating engagement with said washer without contacting said conductors and said member, said nut having an insulating dielectric coating on its exposed exterior surfaces whereby the terminal stud and attached conductor ends are substantially completely surrounded by said insulating cap assembly.

4. A cover for an axially projecting terminal stud of an elongated electrical circuit component and the ends of a conductor which are attached thereto by a terminal clip around said stud and retained by a nut threadedly engaging said stud and bearing against said clip comprising a generally U-shaped insulating block with the lower portion of said block having a generally U-shaped cavity therein conforming to the configuration of said block and open at the end and bottom of the cavity, a washer positioned on the terminal clip retaining nut, said block being seated on said washer with the U-shaped cavity therein encompassing without contacting said conductor and said elongated component, said block having a cylindrical bore therethrough concentric with said terminal stud communicating with said cavity and a counterbore forming a recess at the upper end of said bore, and a one-piece metallic cap nut having a slotted head portion adapted for threaded engagement with said terminal stud, said cap nut having a cylindrical interiorly threaded body portion adapted to fit within said bore and threadedly engage the stud upper portion, said cap nut also having a radially extending annular flange adapted to bear on the bottom of said recess whereby the insulating block is rigidly secured to said component by being pressed into seating engagement with said washer, said nut having an insulating dielectric coating on its exposed exterior surfaces whereby the terminal stud and attached conductor ends are substantially completely surrounded by said insulating cap assembly.

References Cited in the file of this patent

UNITED STATES PATENTS

| | | |
|---|---|---|
| 878,551 | Mills | Feb. 11, 1908 |
| 1,979,999 | Rabezzana | Nov. 6, 1934 |
| 2,446,007 | Hook | July 27, 1948 |
| 2,575,480 | Zimsky | Nov. 20, 1951 |
| 2,636,065 | Fiske | Apr. 21, 1953 |